3,234,183
PROCESS FOR PREPARING POLY(HALOPHENYL-
ENE ETHERS)
Allan S. Hay, Schenectady, N.Y., assignor to General
Electric Company, a corporation of New York
No Drawing. Filed Dec. 31, 1962, Ser. No. 248,191
4 Claims. (Cl. 260—47)

This invention relates to a process for the preparation of poly(halophenylene ethers) by a process which comprises reacting a polyhalophenol having halogen substituents in at least the para and both ortho positions with oxygen in the presence of a dissolved oxygen-carrying intermediate comprising a tertiary amine-basic cupric salt complex at a temperature of from 80° C. up to the reflux temperature of the reaction medium.

In my copending application Serial No. 212,128, filed July 24, 1962, and assigned to the same assignee as the present invention, I disclosed and claimed the process of forming self-condensation products of phenols which comprises reacting oxygen with a phenol having the structural formula

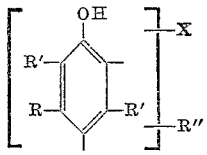

where X is a substituent selected from the group consisting of hydrogen, chlorine, bromine and iodine; R is a monovalent substituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atom and phenol nucleus, R' and R" are the same as R and in addition, halogen, using the oxygen-carrying intermediate, a solution of a tertiary amine-basic cupric salt complex in which the said phenol is soluble. My copending application Serial No. 212,127, filed July 24, 1962, and assigned to the same assignee as the present invention, discloses and claims the process of forming self-condensation products of a more limited class of phenols using as the oxygen-carrying intermediate a solution of primary and secondary amine-basic cupric salt complexes in which the phenol is soluble. The products produced by these processes which are claimed in the former application are either polyphenylene ethers or diphenoquinones. As disclosed in these applications, it is impossible to form self-condensation products of phenols where both ortho positions of the phenol are halogen. For many applications it would be desirable to form polyphenylene ethers which have halogen substituents on at least both of the ortho positions, especially when it is desired to produce polyphenylene ethers having flameproof or flame-extinguishing properties. Poly(halophenylene ether) have previously been made, for example, by Hunter et al., J. Am. Chem. Soc., 38, 1761 (1916), by preparation of silver salts of the halophenols which were then thermally decomposed in solution to precipitate silver halide. The use of silver makes this an extremely expensive method of preparation. In a copending application of Blanchard et al., Serial No. 248,228, filed Dec. 31, 1962, and assigned to the same assignee as the present invention, there is disclosed and claimed another novel way of preparing these poly(halophenylene ethers) which comprises thermally decomposing a preformed pyridine cupric salt phenolate complex.

Although, insofar as I know, it is impossible to produce poly(halophenylene ethers) starting with a 2,6-dihalophenol, I have unexpectedly discovered that these poly(halophenylene ethers) may be produced at elevated temperatures if I start with a phenol which has halogen atoms in at least the 2-, 4-, 6-positions, i.e., the para and both ortho positions, and only certain amines are used to form the amine-basic cupric salt complex. Such phenols may be oxidatively coupled to poly(halophenylene ethers) by reacting them with oxygen using as the oxygen-carrying intermediate a solution of a basic cupric salt complexed with an aromatic, heterocyclic amine in which the phenol is soluble, providing that the reaction is carried out at a temperature of from 80° C. up to the reflux temperature of the solution.

The general method of carrying out my oxidation process is to pass an oxygen-containing gas through a mixture of one or more monohydric, monocyclic halophenols having halogens in at least the para and both ortho positions (hereinafter, for brevity, referred to as "halophenols") as starting material, in a solution also containing dissolved therein at least one basic cupric salt complexed with an aromatic, heterocyclic amine, hereinafter referred to as an aromatic, heterocyclic amine-basic cupric salt complex.

The halophenols, which can be oxidized by my process, are represented by the following formula

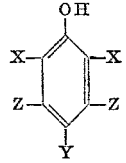

where X is a halogen selected from the group consisting of fluorine and chlorine, and, in addition, bromine when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each Z are bromine. This definition excludes X and Z from being bromine except in the case of pentabromophenol.

In providing the catalyst comprising the complex of the basic cupric salt and aromatic, heterocyclic amine, the particular copper salt used has no effect on the type of product obtained. I may start with either a cupric or cuprous salt. The only requirement is that, if a cuprous salt is used, it must be capable of existing in the cupric state and must form a complex with the aromatic, heterocyclic amine that is soluble in the reaction medium. The necessity for being able to exist in the cupric state is based on my belief that the oxidation of the halophenol is accomplished by the oxygen reacting with the aromatic, heterocyclic amine-cuprous salt complex to form an intermediate, activated, aromatic, heterocyclic amine-basic cupric salt complex that reacts with the halophenol to form an intermediate that decomposes on heating causing the removal of one halogen atom from the halophenol and forming the self-condensation product of the halophenol and water as products with the halogen atom removed from the phenol reacting with and inactivating the aromatic, heterocyclic amine-basic copper salt complex unless oxygen and a free base, e.g., sodium or potassium hydroxide, etc., is present. This activated complex can also be formed by starting originally with a cupric salt in making the copper amine complex, for example, by using a reducing agent which unites with the liberated anion and forms a cuprous salt in situ, e.g., copper metal. However, simpler methods may be used for example, the activated complex may be formed by adding cupric hydroxide to a cupric salt, adding a base to a cupric salt, adding an alkaline metal salt of a phenol (which could be the phenoxide of the phenol reactant) to a cupric salt, by treating the cupric salt with an ion exchange resin having an exchangeable hydroxyl group, etc. Preferably, these reactions to form the basic cupric salt are carried out in the presence of the aromatic, heterocyclic amine to prevent precipitation of the basic cupric salt, but it is possible to add the aromatic, heterocyclic amine later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraammine sulfate, cupric tetraammine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in aromatic, heterocyclic amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt, without first converting them to the corresponding basic cupric salt, gave no oxidation of monocyclic phenols in the presence of an aromatic, heterocyclic amine.

The only requirement of the aromatic, heterocyclic amine, by which term I mean mono-, di-, tri-, etc., amines in which the amino nitrogens are in the aromatic ring and are therefore tertiary amino groups, is that it must form a complex with the copper salt that is soluble in the reaction mixture and stable under the reaction conditions. Primary and secondary amines and the aliphatic tertiary amines are oxidized under the conditions of my reaction and tend to contaminate the product. Only the aromatic heterocyclic amines are capable of forming stable complexes with the copper salts which are stable under the reaction conditions. Typical examples of the aromatic, heterocyclic amines suitable for my process are the pyridines, such as pyridine itself, $\alpha$-, $\beta$-, and $\gamma$-collidine, $\alpha$-, $\beta$-, and $\gamma$-picoline, and 2,4-, 2,5-, 2,6- and 3,4-lutidine, acridine, phenanthridine, the di-pyridyls, the quinolines, the di-quinoyls, the isoquinolines, the phenanthrolines, etc., including the ring-substituted products of these heterocyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), etc. The ring substituents may be the same or different hydrocarbon groups.

Many factors affect the stability of the complex of the heterocyclic amine and the cuprous salt. These factors are well known in the art and are discussed in detail in such texts as "The Chemistry of the Coordination Compounds," edited by John C. Bailar, Jr., Reinhold Publishing Corp., New York, 1956, see for example pages 67–69, 174–190; and "Mechanisms of Inorganic Reactions," Fred Basolo and Ralph G. Pearson, John Wiley and Sons., Inc., New York, 1958, see for example pages 14–24. As pointed out in the latter text on page 18, one of the major factors influencing stability is the basicity of the ligand. I have found that apparently the ability to form a stable complex as indicated by the basicity of the aromatic, heterocyclic amines I use as ligand also is an indication of the activity of the catalyst. Those aromatic, heterocyclic amines which are strong bases form more active catalysts than aromatic, heterocyclic amines which are weak bases. The basicity of the various aromatic, heterocyclic amines as well as additional examples of aromatic, heterocyclic amines which may be used in forming the complex are given in the series of books entitled, "Heterocyclic Compounds," published by the Interscience Publishers, Inc., New York, see for example, the two volumes entitled, "Pyridine and Its Derivatives," by Irwin Klingsberg, Part I, pages 29–31 (1960), and Part II, pages 175–178 and 222–278 (1961).

Typical of the phenol starting materials represented by the above general formula are 2,4,6-trichlorophenol, 2,3,4,6 - tetrachlorophenol, pentachlorophenol, pentabromophenol, 2,6-dichloro-4-bromophenol, 2,6-dichloro-4-iodophenol, 2,6-difluoro-4-chlorophenol, 2,6-difluoro-4-bromophenol, 2,6-difluoro-4-iodophenol, 2,3,5,6-tetrafluoro-4-chlorophenol, 2,6-difluoro-3,5-dichloro-4-bromophenol, 2-chloro-3-bromo-6-fluorophenol, etc.

In the oxidation reaction in which the halophenols are oxidatively coupled to form the poly(halophenylene ethers), the reaction involves the hydrogen of the phenolic hydroxyl group and the halogen in the ortho or para position with the exact position being dependent upon the ease with which the halogen occupying either of these two positions is removed in relation to the halogen in the other position. For example, in the case of 2,4,6-trichlorophenol, chlorine is removed in the oxidative coupling reaction, in some cases in the para position and in some cases in the ortho position, with the chlorine in the para position being preferentially removed. When the halogen in the para position has a higher atomic number than the halogen in either of the ortho positions, e.g., bromine or iodine in the para position and fluorine or chlorine in each of the ortho positions, then the reaction proceeds preponderantly, if not exclusively, by removal of the halogen in the para position. The coupling reaction therefore involves the halogen in either the ortho or para position and the hydrogen of the phenolic hydroxyl group to form the poly(halophenylene ethers). The halogen atom which is removed reacts with and inactivates one molecule of copper in the complex unless oxygen and a free base is also present in the solution. Therefore, it is desirable to use a sufficient amount of the complex to furnish one mole of copper for each atom of halogen removed, or to use a strong acid acceptor, as explained later. This removal of the halogen from either the ortho or para position occurs even though the meta positions are unsubstituted.

As has been indicated previously, certain aromatic, heterocyclic amines give amine-copper complexes which are more reactive in promoting or catalyzing the self-condensation reaction than others, but with any one complex the reactivity is dependent on the copper-to-phenol ratio. The higher the ratio the more rapidly the reaction occurs and in general, the higher the molecular weight of the polyphenylene ethers will be. One way of accomplishing a higher copper-to-phenol ratio without actually using a large ratio for the total halophenol reacted, is to add the halophenol slowly to the solution of the aromatic, heterocyclic amine-basic cupric salt complex through which oxygen is being bubbled. In this way, there is very little unreacted halophenol present in the reaction mixture, and, therefore, the copper-to-phenol ratio is much higher than if all of the halophenol is added at once. I have noticed that this procedure produces products which are lighter in color, indicating that this procedure still further suppresses side reactions.

The poly(halophenylene ethers) produced when the halogen is eliminated from the para position will have repeating units that correspond to the structural formula

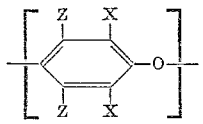

where X and Z are as previously defined for the starting phenol, and the oxygen atom of one unit is connected to the benzene nucleus of the adjoining unit. If a halogen atom is eliminated from one of the ortho positions, the repeating unit will correspond to the structural formula

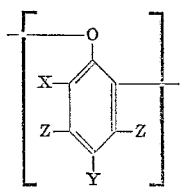

where X, Y and Z are as previously defined for the starting phenol, and again the oxygen atom of one unit is connected to the benzene nucleus of the adjoining unit. However, since the halogens as defined for Y are always equal to or greater in atomic number over the halogens defined for X, the reaction will never go exclusively through the ortho position under these conditions, so that even when the halogens represented by X and Y are the same, the polymer molecule will have some of the phenol units joined through the ortho position and some phenol units joined through the para position, the exact proportion of the two units in the polymer molecule being determined by the reactivity of the halogen in these two positions. This is desirable since the polymers formed exclusively through coupling in the ortho position are low molecular weight oils. As pointed out previously, when the halogen is the same in both the para and ortho position, the para position is generally the more reactive and is preponderantly the reactive position when Y is a halogen of higher atomic number. Such a mixed poly(halopenylene ether) would be represented by a mixture of the above two units. It is understood that these repeating units form a long chain to provide a final molecular structure representing many repeating units. My oxidation process is capable of producing poly(halophenylene ethers) having molecular weights in the range of 7500 to 12,000 and higher.

Although I do not want to be bound by my theory, I believe that one mole of a copper salt forms a complex with 2 moles of amine nitrogen in the aromatic, heterocyclic amine, e.g., a mole of monoamine has one mole of amine nitrogen, a diamine has 2 moles of amine nitrogen, etc. However, it is possible to carry out my reaction with as low as 0.66 mole of amine nitrogen to one mole of copper. However, it may be that in this case only part of the copper is complexed or polynuclear complexes may for. At this low ratio the reaction will be slow and usually the products are much lower in molecular weight than would be obtained by using a higher aromatic, heterocyclic amine-to-copper ratio. The complex formed from a cuprous salt and an aromatic, heterocyclic amine can react with oxygen to form an oxidized intermediate, while the complex formed form a cupric salt is already in the form of the oxidized intermediate which in some manner can form a complex with the phenol. This latter complex activates the aryl nucleus in some way which decomposes on heating to form the polymer chains with the halogen reacting with the copper in the complex to form an inactive form. However, if a hydrogen halide acceptor such as free base is present in the reaction medium, this reacts with the inactive form of the catalyst which in the presence of oxygen regenerates the activated form of the catalyst which can then cause further oxidative coupling of the phenol. This belief is based on the fact that if I pass oxygen into my catalyst system, prepared from a cuprous salt until it is saturated or treat one equivalent of a cupric salt with one equivalent of a base, and then add the halophenol with no further addition of oxygen, one mole of phenol is oxidized for each 2 moles of catalyst present. By such a reaction, I can cause the self-condensation of halophenols without actually passing oxygen into the reaction system containing the halophenol. These reactions are illustrated by the following equations using Cl-$\phi$ to represent the haloaryl nucleus of the phenol reactant with the chlorine being representative of the particular halogen involved in the oxidative coupling reaction, (A) to represent an aromatic, heterocyclic amine, KOH to represent a typical base, and CuCl and CuCl$_2$ to represent typical cuprous and cupric salts.

PREPARATION OF AROMATIC, HETEROCYCLIC AMINE-BASIC CUPRIC SALT COMPLEX

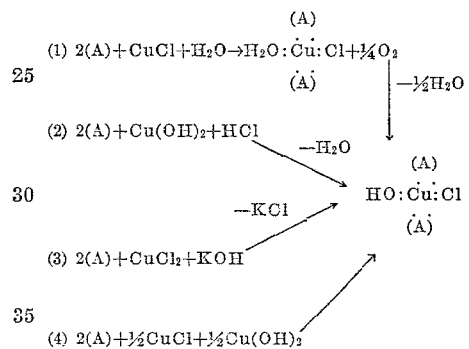

REACTION WITH THE HALOPHENOL

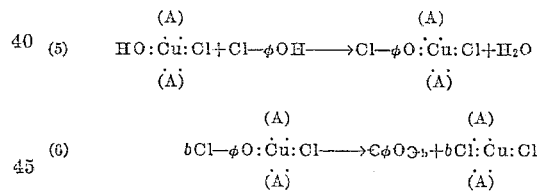

where $b$ can be 2 or more. When $b$ is 2 the product is a poly(halophenylene ether) dimer. Although the copper complex product of Equation 6 should react with one mole of base to give the same product as from Equation 3, it does not until oxygen is passed into the solution. Apparently, the copper is in the cuprous state and has to be reoxidized to the cupric state. It will be noted that although the above is theoretical it does provide indications as to how water is formed and how the complex is regenerated and acts as the oxygen-carrying intermediate. Since water is a product of the reaction and completely anhydrous reagents are extremely difficult to obtain, I have never found it necessary to actually add water to the reaction mixture even when starting with a cuprous salt.

As will be evident from the above equations, it is desirable when starting with a cupric salt to add one equivalent of base for each mole of copper salt to most effectively use all of the copper. If less base is used, then only the equivalent amount of copper salt is converted to the catalytically active aromatic, heterocyclic amine-basic cupric salt complex, leaving the balance of the cupric salt unchanged, which even in the form of its amine complex is an inactive ingredient in the system. If more than one equivalent of base is added, then some or all of the cupric salt might be expected to be converted into cupric hydroxide. However, because the halophenols are strong acids and the halogen removed in the reaction reacts with the base, an excess of base does not interfere with the reaction providing it is not in excess of these acidic or acid producing materials. In effect, the addition of less than one equivalent of base, i.e., one mole of hydroxyl ion to a mole of cupric salt, results in the same effect as though less of the cupric salt had been used to form the aromatic, heterocyclic amine-basic cupric salt complex. This same effect is noted if more than one equivalent of acid, i.e., one mole of hydrogen ion or one mole of a cupric salt, is added to one mole of cupric hydroxide in forming the complex.

The cupric salts of carboxylic acids, for example, cupric acetate, cupric benzoate, etc., represent a unique class of cupric salts. They will form a complex with aromatic, heterocyclic amines which in the presence of oxygen will produce poly(halophenylene ethers), but these products are much lower in molecular weight, and the reaction is slower than if the cupric carboxylate had been converted to the corresponding aromatic, heterocyclic amine-basic cupric carboxylate complex. Evidently because of the weakly acidic nature of carboxylic acids, the halophenols and the cupric carboxylate complex are in equilibrium with the halophenol complex and the carboxylic acid according to the following equation where again Cl-$\phi$ represents the haloaryl nucleus of the halophenol and AcO represents the carboxylate ion, and (A) represents an aromatic, heterocyclic monoamine:

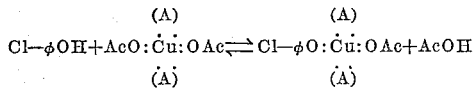

Apparently, the equilibrium is predominantly to the left-hand side of the equation, since the slow reaction indicates a low concentration of the active species.

It will be noted that this phenol-cupric complex on the right-hand side of the equation is the same as would be obtained from a cuprous salt and oxygen or a cupric salt and a base when reacted with a halophenol in a non-equilibrium reaction. In the specification and claims, I use the terms "aromatic, heterocyclic amine-basic cupric salt "complex" and "basic cupric salt complex of an aromatic, heterocyclic amine" to denote the catalytically active complex described above which acts as or is used as the oxygen-carrying intermediate in the oxidation of the halophenols to self-condensation products. As shown above, this complex can be obtained either from cuprous or cupric salts and oxidizes the halophenols to self-condensation products while the copper in the complex is reduced to the cuprous state.

If the quantity of halophenol to be reacted is greater than can be oxidized by the amount of complex present, oxygen is introduced into the reaction mixture to re-oxidize the cuprous complex back to the basic cupric complex in the presence of enough of a halide acceptor such as a strong base, e.g., an alkali metal hydroxide, to react with the halogen removed from the halophenol. Whether this is done or whether the stoichiometric amount of the aromatic, heterocyclic amine-basic cupric salt complex is used to oxidize the halophenol, the net overall reaction in either case is the reaction of oxygen either elemental or from the complex with the phenol. This reaction therefore may best be described as the reaction of halophenols with oxygen using the aromatic, heterocyclic amine-basic cupric complex as the oxygen-carrying intermediate.

Although mixtures of aromatic, heterocyclic amines and mixtures of copper salts may be used, no benefit generally accrues from such use. Many different solvents may be used for carrying out the oxidation reaction. I have noted that the polar solvents are better solvents than non-polar solvents for the aromatic, heterocyclic amine-basic cupric salt complexes and therefore higher concentrations of the complex may be obtained by using a polar solvent. This is sometimes desirable in order to obtain the fastest reactions and highest molecular weight polymers. The solubility of the complexes in non-polar solvents may be increased by increasing the amine-to-copper ratio, but this is not always desirable, since the amine is expensive and requires additional washing steps to insure removal of the amine from the final product.

Preferably, the copper complex is dissolved in the solvent before the halophenol reactant is added. In some cases, the dissolving of the cuprous salt if it is used may be hastened by heating the mixture, by bubbling in air or oxygen, or a combination thereof. In order to effectively use all of the copper, enough aromatic, heterocyclic amine should be added to complex and thereby dissolve all the added copper salt. Larger excesses of amine do not adversely affect the reaction, and in some cases may be desirable in order to completely dissolve all of the halophenol reactant, or to increase the solubility of the complex, and in fact may be used as the solvent for the reaction product. Other solvents such as alcohols, ketones hydrocarbons, chlorohydrocarbons, nitrohydrocarbons, ethers, esters, amides, mixed ether-esters, sulfoxides, etc., may be present in the reaction system providing they do not interfere or enter into the oxidation reaction. The sole function of the solvent is to provide a liquid phase in which both the halophenol and aromatic, heterocyclic amine-basic cupric salt complex is soluble. It need not act as a solvent for the reaction products. The higher molecular weight poly(halophenylene ethers) increase the viscosity of the reaction mixture. Therefore, it is sometimes desirable to use a solvent system which will cause them to precipitate while permitting the lower molecular weight polymers to remain in solution until they form the higher molecular weight polymers.

When less than the stoichiometric amount of the aromatic, heterocyclic amine-basic cupric salt complex is used, oxygen or an oxygen-containing gas is bubbled into the reaction mixture at a temperature of from 80° up to the reflux temperature of the reaction mixture containing sufficient halide acceptor to react with the halogen removed from the phenol, water being formed as a by-product. Since this method permits the same products to be formed but uses less quantities of the complex, I prefer to use this method. If a solvent is used for the reaction medium which is not miscible with the water formed, it is desirable to remove the water fast enough to prevent the formation of a separate phase which tends to inactivate the catalyst, perhaps by extraction or hydrolysis. If the temperature of the reaction is not high enough to cause the water to distill from the reaction mixture as fast as it was formed, alcohols, for example ethanol, isopropanol, etc., which are miscible with the reaction mixture, can be used to prevent the formation of a separate aqueous phase. When the solvent is miscible with water, no special precautions need to be taken to remove the water when the solvent is not to be reused without purification, e.g., in a batch process. However, water may be removed if desired, and should be removed, if the solvent is to be reused without purification, e.g., in a continuous, recycling process. The removal of water can be aided by sweeping with an inert gas, by carrying out the reaction at subatmospheric pressure, by use of desiccants, by azeotropic distillation, by use of open reaction vessels, or any combination thereof. Desiccants are especially useful for removing excess water where the water forms faster than it can be distilled from the reaction mixture, and forms a separate phase with the reaction medium.

In carrying out my reaction using oxygen, the oxygen can be diluted with an inert gas such as nitrogen, helium, argon, etc., or air can be used. By controlling the ratio of oxygen to inert gas, the inlet temperature of this mixture, and the temperature of the reaction, I can conveniently sweep the reaction mixture to cause removal of all the water as it is formed.

Ordinarily, I continue the passing of oxygen into the reaction mixture until the desired amount of oxygen is absorbed. Alternatively, I may intermittently or continuously add the same or different halophenol than the starting material during the oxidation reaction. If a different halophenol is added, the product is a mixed poly(halophenylene ether) which has a different structure than if the mixed phenols were used as starting materials. Likewise, I may if desired add other phenols such as those disclosed in my copending application Serial No. 212,128, for example, phenol itself, 2,6-xylenol, 2,6-diethyldihalophenol, etc., to modify the properties of the final product. To terminate the reaction, I destroy the catalyst system by addition of an acid, preferably a mineral acid, for example, hydrochloric acid or sulfuric acid, etc., or a base, for example, lime, sodium hydroxide, potassium hydroxide, etc., which reacts with the complex of the aromatic, heterocyclic amine and basic cupric salt, or I remove the product from the presence of the catalyst either by filtering off the product if it has precipitated, or by pouring the reaction mixture into a material which is a solvent for the catalyst system, but a non-solvent for the product. Alternatively, I may precipitate the copper as an insoluble compound and filter it from the solution prior to isolating the product, or I may add a chelating agent which inactivates the copper, or I may pass the solution over an active absorbent for the catalyst and other by-products. After the product is precipitated it may be redissolved and reprecipitated any desirable number of times to remove impurities. Finally, it is filtered and washed free of any remaining contaminants. When dry, the product can be fabricated into useful products by molding, extrusion, melt spinning, etc.; it may be dissolved in solvents to prepare solutions which can be used in the preparation of coatings, fibers, adhesives, etc., or it may be mixed with other polymers to modify their properties, for example, to increase the flame resistance of such products, etc.

In order that those skilled in the art may better understand my invention, the following examples are given which are illustrative of the practice of my invention, and are not intended for purposes of limitation. In the examples, all parts are by weight, unless otherwise stated.

Example 1

Oxygen was bubbled through a vigorously stirred solution of 3 grams of cuprous chloride, 10 ml. of pyridine, and 5 grams of 2,4,6-trichlorophenol dissolved in 135 ml. of nitrobenzene, which was heated to the temperature of a steam bath. At the end of 4 hours, the reaction mixture was poured into methanol to precipitate the polymer which was dissolved in chloroform, filtered and reprecipitated. There was obtained 3.6 grams of a colorless polymer of poly(dichlorophenylene ether) containing 43.8% chlorine and having a softening point of 217° C., and a molecular weight of about 13,000. Higher molecular weight polymers can be obtained by continuing the reaction for a longer period of time. A reaction period of about 24 hours will give molecular weights greater than 40,000.

Example 2

When Example 1 is repeated in which the 3 grams of cuprous chloride are replaced with 5.1 grams of cupric chloride dihydrate, no reaction occurs. However, when 1.68 grams of potassium hydroxide dissolved in 15 ml. of ethanol are added to the reaction mixture, the reaction proceeds rapidly at the temperature of the steam bath. A product essentially identical with that of Example 1 is obtained. Likewise, the same reaction occurs when 3 grams of cupric hydroxide and 2.43 ml. of 12 M hydrochloric acid in one case, and 1.5 grams of cupric hydroxide and 2.55 grams of cupric chloride dihydrate, are used as the source of copper forming the complex. In these latter two reactions, there is an initial induction period, presumably while the catalyst is equilibrating, after which the reaction is as rapid as that obtained either with the use of cuprous chloride or cupric chloride treated with potassium hydroxide. Likewise, when the reaction is repeated using 6 grams of cupric acetate monohydrate as the source of copper, the reaction is very slow requiring a period of over 8 hours for the reaction to produce a very low molecular weight polymer. However, when the cupric acetate is treated with 1.68 grams of potassium hydroxide dissolved in 15 ml. of ethanol, the reaction proceeds in the normal 4-hour period, but the polymer is still of a lower molecular weight than that obtained from the copper chloride catalyst.

Example 3

Example 1 was repeated in which the nitrobenzene solvent was replaced with benzonitrile, orthodichlorobenzene, and dimethylacetamide in three different tests. There was no noticeable effect either in the rate of reaction or the type of product obtained by this use of these different solvents.

Example 4

To prepare poly(tetrachlorophenylene ether), oxygen is bubbled through a vigorously stirred solution of 3 grams of cuprous chloride, 10 ml. of pyridine, and 8 grams of pentachlorophenol in 135 ml. of diphenyl ether heated to a temperature of 200° C. for a period of 4 hours. The polymer is precipitated and purified as described in Example 1 to obtain a light tan polymer of poly(tetrachlorophenylene ether) having a chlorine content slightly less than the theoretical amount of 61.7% and a molecular weight of about 11,000.

In a similar way, poly(tetrabromophenylene ether) is made by starting with pentabromophenol.

Example 5

This example illustrates that when the reaction is carried out in the presence of oxygen and a halide acceptor, specifically an alkali metal hydroxide, it is not necessary to use 1 mole of copper for each mole of halophenol being reacted. Oxygen is bubbled through a vigorously stirred solution of 1 gram of cuprous chloride, 10 ml. of pyridine, 5 grams of 2,4,6-trichlorophenol and 0.9 gram of potassium hydroxide in 135 ml. of nitrobenzene, heated on a steam bath. After 4 hours' reaction, the polymer is precipitated as described in Example 1, to give 3.8 grams of polymer essentially identical with that obtained in Example 1.

The following example illustrates that when a basic cupric salt is used, in the absence of oxygen, the amount of halophenol which is oxidatively coupled is dependent on the amount of copper present in the complex.

Example 6

A solution of 3.1 grams of potassium hydroxide in 10 ml. of ethanol was added to a vigorously stirred solution of 9.9 grams of 2,4,6-trichlorophenol, 6.8 grams of cupric chloride dihydrate and 10 ml. of pyridine in 135 ml. of o-dichlorobenzene in a nitrogen atmosphere. The reaction mixture was heated to 100° C. on a steam bath. The red-brown solution became green-black after 35 minutes. After a reaction period of 60 minutes, the poly(dihalophenylene ether) was precipitated by pouring the reaction mixture into an excess of methanol acidified with aqueous hydrochloric acid. After reprecipitation from a chloroform solution the yield of polymer was 5.5 grams and had a softening point of about 200° C.

When the above example was repeated but the amount of cupric chloride was reduced to 3.4 grams, the color change did not occur until 65 minutes and the yield of polymer was only 2.2 grams after a total reaction time of 108 minutes. The polymer had a softening point of 190° C.

Reducing the cupric chloride to 1.7 grams increased the time for the color change to 135 minutes and the yield of polymer was only 1.7 grams after a reaction time of 180 minutes. The softening point of the poly(dihalophenylene ether) was 180° C.

Because of their excellent physical, mechanical, chemical, electrical and thermal properties, the polymers of this invention have many and varied uses. For example, they can be used in molding powder formulations, either alone or mixed with other polymers and may contain various fillers, such as wood flour, diatomaceous earth, carbon black, silica, etc., to make molded parts, such as spur, helical, worm or bevel gears, ratchets, bearing, cams impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, magnetic tapes, photographic films, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics, useful in many applications, for example, as filter cloths where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

Obviously, other modifications and variations of the present invention are possible in the light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. The process of forming poly(halophenylene ethers) which comprises reacting oxygen with a phenol having the structural formula

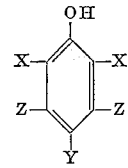

where X is a halogen selected from the group consisting of fluorine and chlorine and, in addition bromine, when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each Z are bromine, using as the oxygen-carrying intermediate a solution of a basic cupric salt complex with an aromatic, heterocyclic amine in which said phenol is soluble, said reaction being carried out at a temperature of from 80° C. up to the reflux temperature of the solution.

2. The process of claim 1 wherein the phenol is 2,3,4,5,6-pentachlorophenol.

3. The process of claim 1 wherein the phenol is 2,4,6-trichlorophenol.

4. The process of claim 1 wherein the phenol is 2,6-dichloro-4-bromophenol.

References Cited by the Examiner
UNITED STATES PATENTS
3,134,753   5/1964   Kwiatek _____ 260—47

OTHER REFERENCES

Staffin: Rubber World, vol. 139, p. 408, December 1958.

Hay et al.: J.A.C.S., vol. 81, pp. 6335–6336, December 1959.

WILLIAM H. SHORT, *Primary Examiner.*